Feb. 13, 1945.  W. A. BERG  2,369,428
LUBRICATING DEVICE
Filed Nov. 24, 1941
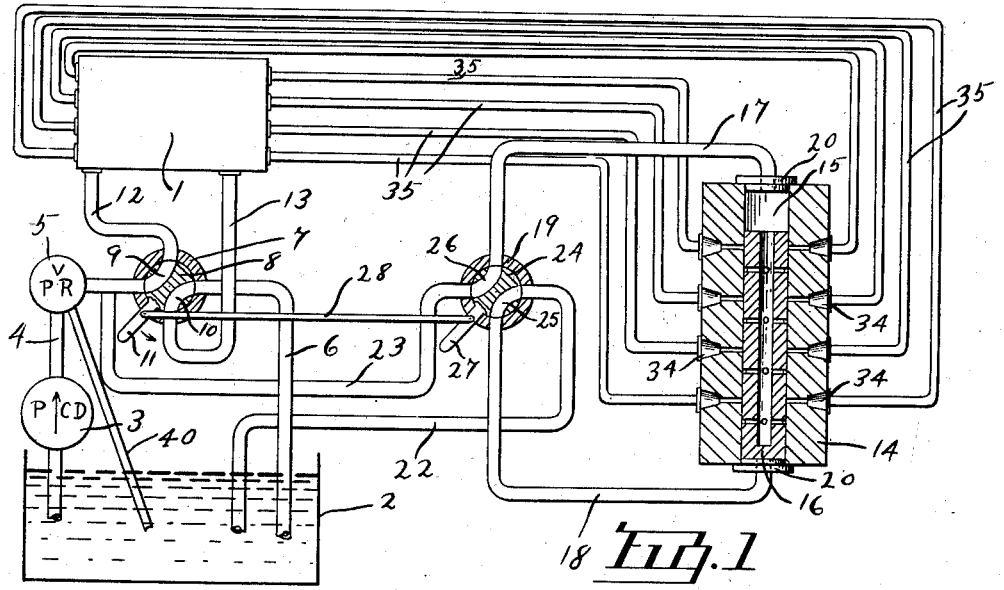
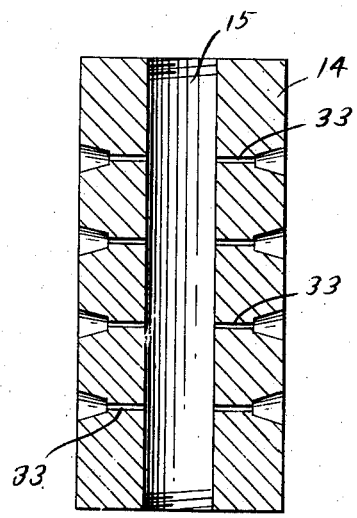
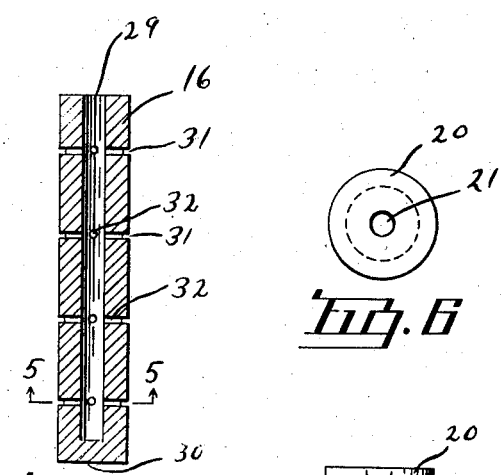
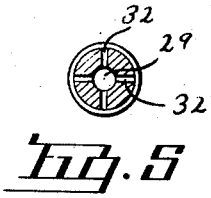
INVENTOR.
William A. Berg
BY Barnes, Kisselle, Laughlin & Raisch
ATTORNEYS.

Patented Feb. 13, 1945

2,369,428

UNITED STATES PATENT OFFICE 2,369,428

LUBRICATING DEVICE

William A. Berg, Detroit, Mich., assignor to Frederick Colman & Sons, Inc., Detroit, Mich., a corporation of Michigan Application November 24, 1941, Serial No. 420,251

5 Claims. (Cl. 184—7)

This invention relates to a lubricating device. More particularly the invention is concerned with a lubricator for feeding and distributing a lubricant or the like from a source under pressure to a multiplicity of points requiring lubrication such, for example, as the bearing or friction surfaces on a machine.

It is the object of this invention to produce a device for distributing a lubricant or the like which is simple in structure, economical to manufacture, durable, compact, highly efficient and positive in action, easily and quickly installed and possessed of a minimum of parts.

In the drawing:

Fig. 1 is a diagrammatic showing of the complete lubricating system showing the lubricant distributing device in section.

Fig. 2 is a sectional view along the line 2—2 of Fig. 3 of the lubricator housing.

Fig. 3 is an end view of the housing.

Fig. 4 is a longitudinal section of the distributing valve.

Fig. 5 is a section of the valve along the line 5—5 of Fig. 4.

Figs. 6 and 7 are detail views of the end plugs for the housing.

Referring more particularly to the drawing there is shown diagrammatically a machine 1 which requires lubrication. The machine 1 obviously can be any kind of a machine such as a shell turning machine, screw machine, press, metal or wood working machines. In fact, the lubricating device is applicable to any kind of a machine having bearings, friction surfaces, or other points which require lubrication.

The machine 1, as herein shown, is hydraulically operated by means of a hydraulic power system comprising a reservoir 2 for a liquid such as a lubricating oil or similar substance, a pump 3, preferably but not necessarily of the constant delivery type, connected to the machine 1 and the reservoir 2 by a conduit or oil pipe line 4. A pressure relief valve 5 is also mounted in the line 4 for bypassing the oil through line 40 from the pump back into the reservoir 2 whenever the pressure reaches a predetermined point. The return oil line from the valve 7 to the reservoir 2 is designated 6. A four-way valve 7 is connected into lines 4 and 6 and is connected to the machine by lines 12 and 13. The inner rotary valve member 8 is provided with passageways 9 and 10 and is rotated by means of hand lever 11. As shown in Fig. 1, the passageway 9 connects lines 4 and 12 together whereas passageway 10 connects lines 13 and 6 together. As shown in Fig. 1, lines 4 and 12 constitute the high pressure line and lines 13 and 6 the low pressure or exhaust return line to the reservoir.

The lubricating feeder or distributing device comprises a housing 14 having an opening 15 therein. The opening 15 preferably is cylindrical and serves as a cylinder for the sliding valve 16. The opposite ends of cylinder 15 are connected by pipe lines 17 and 18 to another four-way valve 19. Lines 17 and 18 connect into the plugs 20 which are screwed into the ends of the housing 14 for closing the opposite ends of the cylinder 15. Plugs 20 are provided with openings 21 which have a liquid tight fit with lines 17 and 18. Four-way valve 19 is connected with the reservoir 2 by line 22 and with line 4 by line 23. The inner rotatable valve member 24 is provided with passageways 25 and 26 and is rotated by a lever 27 connected by a link 28 with lever 11. Valves 7 and 19 are connected together for simultaneous operation. The particular valves and the arrangement for connecting the valves together for coincidental operation are shown for purposes of description and not by way of limitation. As shown in the full lines of Fig. 1, passageway 26 connects line 17 with the high pressure line 23 and passageway 24 connects line 18 with the exhaust or return oil line 22.

It will be noted that the valve 16 is provided with a longitudinal bore or passageway 29 but the end of the valve is closed as at 30. The valve 16 is provided with a plurality of circumferential grooves 31 which communicate with bore 29 by the radially extending passageway 32.

The housing 14 is provided with a plurality of passageways 33 extending radially from cylindrical opening 15 and spaced longitudinally of cylinder 15 the same distance that grooves 31 are spaced longitudinally of valve 16. Passageways 33 are connected by suitable fittings 34 with a plurality of oil or lubricating lines 35 which are connected into the machine 1 at the points or surfaces needing lubrication.

The operation of the device is as follows: As shown in Fig. 1, the operator has set machine 1 in operation by throwing valve handle 11 to the left, as indicated, so that lines 4 and 12 are high pressure lines to the machine 1 and lines 13 and 6 are return or exhaust oil lines. By swinging handle 11 to the left, as shown, link 28 acts through lever 27 to actuate four-way valve 19 so that lines 23 and 17 are high pressure lines and lines 18 and 22 are return oil lines. The high pressure lubricant entering cylinder 15 through line 17 shifts valve 16 longitudinally in cylinder 15 to the position shown in Fig. 1. As valve 16 travels downwardly from the upper end of cylinder 15 to the lower end, circumferential grooves 31 momentarily communicate with passageways 33. Since line 17 is a high pressure oil or lubricant line, high pressure oil is also present in cylinder 15 above valve 16 and throughout bore 29, passageways 32 and grooves 31. As grooves 31 momentarily communicate with passageways 33 a predetermined quantity of oil, due to the pressure existing in line 17, is shot into lines 35 and thereby fed into the machine 1.

When the operator stops the machine by swinging lever 11 to the right, passageway 9 in valve 7 then connects lines 4 and 13 and passageway 10 connects lines 12 and 6 which become the exhaust or return oil line. As lever 11 is swung to the right, link 28 moves lever 27 ninety degrees to the right thereby rotating valve member 24 so that passageway 25 now connects lines 22 and 17 making them an exhaust or return oil line and passageway 26 connects lines 23 and 18 making them a high pressure line. The oil under pressure now reacts against the closed end of valve 16 and causes it to move upwardly to the upper end of cylinder 15, Fig. 1. On the up or return stroke of valve 16 grooves 31 again communicate with and pass by passageways 33 thereby ejecting some oil into lines 35 and thence into the points to be oiled on the machine 1.

On the return stroke of valve 16 the pressure on the oil in cylinder 15 and passageway 29 of valve 16 is caused primarily by the return stroke of the valve acting against the inertia of the oil in the valve 16, cylinder 15 and return oil lines 17 and 22. This pressure, of course, will not be nearly as high as the pressure on the oil during the down stroke of the valve 16, above described, when line 17, as shown in the drawing, is connected through valve 19 with the high pressure line 23. On the return or upward stroke of valve 16 there is a back pressure existing in line 17. This back pressure will cause a small amount of oil to be fed through passageways 32 as they momentarily communicate with ports 33 in cylinder 14. However, both on the high pressure or down stroke of valve 16, as well as on the return or up stroke of valve 16, grooves 31 communicate momentarily with passageways 33 and thereby feed or discharge oil into oil lines 35 which conduct the oil to the points to be lubricated in machine 1.

The pressure developed by the pump 3 will vary with the type of pump used and the speed of operation. A pressure of three hundred pounds per square inch is not an uncommon pressure. Thus, it will be seen that with a high pressure of, say, three hundred pounds per square inch being developed by the pump 3 that the operation of this lubricator is positive. Such a high pressure acting against valve 16 to reciprocate it on its down and return stroke positively moves the valve 16 so that there is no opportunity or chance of oil not being fed into the oil lines 35. Further, in feeding the oil from the high pressure line through passageway 29, ports 32, circumferential grooves 31, into passageways 33 and conduits 35, no check valves and other moving parts which are apt to stick or gum-up are used. Thus, the feed of the oil is positive and certain. The amount of oil fed into the lines 35 per stroke of the valve 16 will be determined by the pressure developed by the pump 3 and the size of passageways 32, 31 and 33. Obviously, if more oil is needed, the diameter of these openings will be increased and if less oil is needed, the diameter of these openings will be decreased.

Four way valves 7 and 19 are shown for descriptive purposes and not by way of limitation. Also the return or up stroke of valve 16 is effected preferably but not necessarily by oil pressure from line 18. Mechanical means such as a spring could be used to return valve 16 on its up stroke, but the use of oil under pressure from line 18 is preferred.

I claim:

1. Lubricating apparatus comprising in combination a source of lubricant under pressure, a cylinder provided with a plurality of ports in the side wall thereof, said ports being spaced longitudinally of said cylinder, liquid lines leading from said ports to the parts to be lubricated, a hollow piston valve reciprocable in said cylinder, said hollow piston valve having an open end through which the hollow interior of the piston valve communicates with the interior of said cylinder, the other end of said hollow piston valve being closed, a first conduit connected to the cylinder on one side of the valve, a second conduit connected into the cylinder on the other side of the valve, means for alternately connecting the first and second conduits with said source of lubricant under pressure while alternately opening the first and second conduits to exhaust the cylinder whereby each conduit serves alternately as a pressure line while connected to the source of lubricant under pressure and then as an exhaust conduit while the other conduit is connected to the source of lubricant under pressure, said piston valve having a plurality of ports therein, said ports in the piston valve being spaced longitudinally of said valve, each cylinder port having a cooperating port in said piston valve, each of said valve ports during each stroke of the piston valve traveling from one side of its cooperating cylinder port into communication with said cooperating cylinder port and then to the other side of its cooperating cylinder port whereby the ports in the cylinder wall communicate through the ports in the piston with the interior of the hollow piston valve, the alternate connecting of the first and second conduits with the source of lubricant under pressure causing said piston valve to reciprocate in the cylinder whereby the ports in the piston communicate momentarily with the ports in the cylinder wall during a portion only of each stroke of the piston and lubricant flows from the ports in the cylinder through the liquid lines to the parts to be lubricated.

2. The combination as claimed in claim 1 wherein the piston valve takes the form of a hollow cylinder closed at one end, the said ports in the piston valve extending radially from the outer wall of the piston valve into the hollow interior of the piston valve, the longitudinal spacing of the ports in the cylinder corresponding to the longitudinal spacing of the ports in the piston valve whereby communication between all of the cooperating ports in said piston valve and cylinder occurs substantially simultaneously.

3. Lubricating apparatus comprising in combination a source of lubricant under pressure, a cylinder provided with a plurality of ports in the side wall thereof, said ports being spaced longitudinally of said cylinder, liquid lines leading from said ports to the parts to be lubricated, a piston valve reciprocable in said cylinder, a first conduit connected to the cylinder on one side of the valve, a second conduit connected into the cylinder on the other side of the valve, means for alternately connecting the first and second conduits with said source of lubricant under pressure while alternately opening the first and second conduits to exhaust the cylinder whereby each conduit serves alternately as a pressure line while connected to the source of lubricant under pressure and then as an exhaust conduit while the other conduit is connected to the source of lubricant under pressure, said piston valve being in the form of a hollow cylinder closed at one end and provided with spaced circumferential grooves, and passageways connecting the grooves with the hollow interior of said valve, said grooves in the piston valve being spaced longitudinally of said valve, each cylinder port having a cooperating groove in said piston valve, each of said valve grooves during each stroke of the piston valve traveling from one side of its cooperating cylinder port into communication with said cooperating cylinder port and then to the other side of its cooperating cylinder port whereby the ports in the side wall of the cylinder communicate through the circumferential grooves and passageways in the piston valve with the interior of the cylinder during a portion only of each stroke of the piston and lubricant flows from the ports in the cylinder wall through the liquid lines to the parts to be lubricated, the alternate connecting of the first and second conduits with the source of lubricant under pressure causing said piston valve to reciprocate in the cylinder.

4. Lubricating apparatus comprising in combination a source of lubricant under pressure, a cylinder provided with a plurality of ports in the side wall thereof, said ports being spaced longitudinally of said cylinder, liquid lines leading from said ports to the parts to be lubricated, a hollow piston valve reciprocable in said cylinder, a first conduit connected to the cylinder on one side of the valve, a second conduit connected into the cylinder on the other side of the valve, a valve connected into the first and second conduits for alternately connecting the first and second conduits with said source of lubricant under pressure while alternately opening the first and second conduits to exhaust the cylinder whereby each conduit serves alternately as a pressure line while connected to the source of lubricant under pressure and then as an exhaust conduit while the other conduit is connected to the source of lubricant under pressure, said piston valve having radial ports therein extending completely through its side wall, said ports in the piston valve being spaced longitudinally of said valve, each cylinder port having a cooperating port in said piston valve, each of said valve ports during each stroke of the piston valve traveling from one side of its cooperating cylinder port into communication with said cooperating cylinder port and then to the other side of its cooperating cylinder port whereby the ports in the cylinder wall communicate through the ports in the piston with the interior of the cylinder, the alternate connecting of the first and second conduits with the source of lubricant under pressure causing said piston valve to reciprocate in the cylinder whereby the ports in the piston communicate momentarily with the ports in the cylinder wall during a portion only of each stroke of the piston and lubricant flows from the ports in the cylinder through the liquid lines to the parts to be lubricated.

5. An apparatus for discharging lubricant or the like comprising a cylinder having openings at opposite ends, a plurality of outlets from said cylinder adapted to be connected to the devices to be lubricated, said outlets being spaced longitudinally of said cylinder, a hollow piston valve reciprocable in said cylinder for controlling said outlets, the interior of said hollow piston valve communicating through one of its ends with the interior of said cylinder, a plurality of longitudinally spaced passageways through the side wall of said piston, each outlet from the cylinder having a cooperating passageway through said hollow piston valve, each said passageway during each stroke of the piston valve traveling from one side of its cooperating outlet into communication with said cooperating outlet and then to the other side of its cooperating outlet in the cylinder, a source of lubricant under pressure, a line for optionally connecting one of said openings at the end of the cylinder and on one side of said valve with said source of lubricant while the other of said openings at the opposite end of said cylinder serves as an exhaust port whereby said lubricant under pressure reacts against said valve causing the same to travel one stroke in said cylinder and each outlet is placed momentarily in communication through its cooperating passageway in said valve with said source of lubricant under pressure and lubricant is discharged through each of said outlets, and means for returning the valve to its initial position when said line is disconnected from the source of lubricant under pressure.

WILLIAM A. BERG.